(12) United States Patent
Azzopardi et al.

(10) Patent No.: US 6,299,981 B1
(45) Date of Patent: Oct. 9, 2001

(54) SUBSTRATE WITH IMPROVED HYDROPHILIC OR HYDROPHOBIC PROPERTIES, COMPRISING IRREGULARITIES

(75) Inventors: Marie-Jose Azzopardi, Vincennes; Laurent Delattre; Xavier Talpaert, both of Paris, all of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/117,169

(22) PCT Filed: Nov. 18, 1997

(86) PCT No.: PCT/FR97/02068

§ 371 Date: Feb. 26, 1999

§ 102(e) Date: Feb. 26, 1999

(87) PCT Pub. No.: WO98/23549

PCT Pub. Date: Jun. 4, 1998

(30) Foreign Application Priority Data

Nov. 26, 1996 (FR) .................................................. 96 14405

(51) Int. Cl.$^7$ ...................................................... B32B 17/06
(52) U.S. Cl. ........................... 428/429; 428/432; 428/447; 428/372; 428/149; 428/148; 428/142; 428/401; 427/165; 427/163.1; 427/201; 427/292; 427/309

(58) Field of Search ...................................... 428/143, 148, 428/149, 432, 447, 364, 372, 142, 429, 401, 402, 206; 427/165, 163.1, 201, 292, 309

(56) References Cited

U.S. PATENT DOCUMENTS

| 4,474,843 | * | 10/1984 | Miyoshi et al. . |
| 4,944,986 | * | 7/1990 | Zuel . |
| 5,856,016 | * | 1/1999 | Takahashi et al. . |
| 6,040,053 | * | 3/2000 | Scholz et al. . |

FOREIGN PATENT DOCUMENTS

| 0629673 | * | 12/1994 | (EP) . |
| 0651379 | * | 3/1995 | (EP) . |

* cited by examiner

Primary Examiner—Deborah Jones
Assistant Examiner—Wendy Boss
(74) Attorney, Agent, or Firm—Oblon, Spivak, McClelland, Maier & Neustadt, P.C.

(57) ABSTRACT

Substrate, at least part of at least one of the faces of which has a geometry which is optionally obtained by means of a coating and which differs from that of an ideal uniform, perfectly plane or even slightly curved, sheet, in that it has a bumps-and-hollows relief which can be defined by sub-micron sizes which, almost in their entirety, fall into at least two different classes, the respective representative values of which vary by a factor of at least 5 or of at most 1/5; applications of this substrate to anti-stain and anti-mist or anti-rain glazing; processes for preparing the substrate.

21 Claims, No Drawings

SUBSTRATE WITH IMPROVED HYDROPHILIC OR HYDROPHOBIC PROPERTIES, COMPRISING IRREGULARITIES

The invention relates to substrates, in particular transparent substrates, on which it is desired preferably to confer the properties of hydrophobicity/oleophobicity or of hydrophilicity/oleophilicity with a view to obtaining certain anti-rain/anti-stain or anti-mist effects, respectively. To this end, these substrates are, for example, provided with coatings within the context of the manufacture of glazing for various applications, such as the windows for transportation vehicles or for buildings.

It is known to incorporate the functions of hydrophobicity/oleophobicity or of hydrophilicity/oleophilicity on the surface of substrates of various types. Both these functions concern the wettability of the substrates.

The hydrophobicity/oleophobicity property of a substrate occurs when the contact angles between a liquid and this substrate are high, for example about 120° in the case of water. The liquid then tends to flow readily, in the form of drops, over the substrate, simply by gravity if the substrate is inclined, or due to the effect of aerodynamic forces in the case of a moving vehicle. Known agents for conferring this hydrophobicity/oleophobicity property are, for example, fluorinated alkylsilanes such as those described in Patent Application EP-A1-0,675,087. They are applied in a known manner in solution using conventional methods of deposition, with or without heating.

In contrast, the hydrophilicity/oleophilicity property of a substrate is manifested by small contact angles between a liquid and this substrate, of about 5° in the case of water on clean glass. This property is conducive to the formation of thin transparent liquid films, to the detriment of that of mist, consisting of minute droplets impairing visibility through a transparent substrate. Many hydrophilic agents, in particular those containing hydroxyl groups, such as poly (hydroxyalkyl (meth)acrylate) polymers, are used for this purpose, in a known manner, for transparent substrates. Some compounds, called photocatalytic compounds, such as $TiO_2$, are moreover used, in particular in combination with glass substrates, not only for their hydrophilic character after exposure to light but also for their ability to decompose stains of organic origin by a process of radical oxidation. It is known to deposit coatings with a photocatalytic property, comprising $TiO_2$, starting with at least one titanium precursor, if necessary in solution, by liquid-phase pyrolysis, by a sol-gel technique or by chemical vapour deposition.

In accordance with the foregoing, the property of hydrophobicity/oleophobicity is quantitatively assessed by measuring the contact angle formed, most often by a drop of water, on a given substrate. In the absence of further information, this contact angle is measured on a horizontal substrate. In reality, as already mentioned above, it is the dynamic behaviour of drops of liquid which is targeted by the action of conferring hydrophobicity on a substrate. This applies equally well to approximately vertical static substrates, such as exterior windows of buildings or the glazing panels used in showers, as to the windows of transportation vehicles. However, in the case of a drop of liquid on a substrate which is inclined to the horizontal, two different contact angles are observed—the advancing contact angle and the receding contact angle, these being determined at the front and rear, respectively, of the drop with respect to the direction in which it is moving. These angles are values reached at the limit of detachment of the drop. The difference between the advancing contact angle and the receding contact angle is called hysteresis. A drop of water having a high hysteresis or a small receding contact angle will have difficulty in flowing over a substrate. Thus, it may easily be understood that effective hydrophobicity is dependent both on a high advancing contact angle and a low hysteresis.

In this regard, the inventors have specifically obtained excellent results never yet achieved until now. Exceptionally easy and rapid flow of drops of liquid, more specifically of water, has been obtained over a substrate according to the invention, which was subjected beforehand to a hydrophobic treatment. What is more, they were able to verify that the measurements provided in accordance with the invention make it possible, at the very least, to preserve, or even increase, the effects of a hydrophilic treatment applied to a substrate.

According to the invention, this essential objective, consisting in accentuating the hydrophobicity/oleophobicity or hydrophilicity/oleophilicity properties of a substrate, is achieved with a substrate on which irregularities of submicron size have been formed, the sizes of these falling, almost in their entirety, into at least two different classes, the respective representative values of which vary by a factor of at least 5 or of at most 1/5.

A particularly advantageous variant is characterized by the existence of two classes of different sizes, as just defined, the representative values of which vary respectively by a factor of at least 100 or of at most 1/100.

In order to preserve the optical properties, in particular of a transparent substrate, the sizes of the irregularities preferably do not exceed 150 nm, so as to avoid or limit the appearance of diffuse transmission of light.

The irregularities form a bumps-and-hollows relief on the substrate and correspond in general, to a greater or lesser extent, to regular geometric shapes having any orientation with respect to the substrate. The term "bumps and hollows", used to define the subject of the invention, must be understood in the broad sense as simply meaning, respectively, the presence and the absence of material. The sizes of the irregularities, in the sense of the invention, thus correspond substantially to the diameters of spheres or cylinders, to the heights of cylinders or to the sides of polyhedra, these being oriented, with respect to the plane of the substrate, perpendicular to the latter, parallel to it or in any direction. These sizes may also correspond to the dimensions of a hollow, in particular to the space between two protuberances or to the depth of such a hollow.

According to a first embodiment, the irregularities consist, entirely or partly, of objects incorporated into the surface of the substrate and are each defined by at least two dimensions falling into different classes, as defined above. These objects may be different or identical, but advantageously they consist of identical rods having a single orientation, in particular an orientation perpendicular to the plane of the substrate, or having many orientations.

According to a second embodiment, the bumps-and-hollows relief of the substrate is formed, entirely or partly, by relatively small-size objects which are grafted onto objects falling into a class of larger sizes, in the sense of the invention. Of course, it is necessary to spread out the objects of larger sizes sufficiently well over the substrate in such a way that they do not form a compact cluster in which it is no longer possible to discern their individual size. The same applies to the small-sized objects.

In a third embodiment, differing only slightly from the previous one, the surface irregularities of the substrate consist of agglomerates of relatively small objects, which form objects falling, of course, into a class of larger sizes. As in the previous case, it is important for all the objects to be arranged so as to reveal at the same time the two orders of irregularity sizes. In particular, it is necessary for the small objects in the external layers of the agglomerates to be sufficiently spaced apart.

Within the context of the invention, the substrate, provided with its coating, is advantageously transparent; it may be based on glass or on a plastic such as poly(methyl methacrylate) (PMMA), polyvinyl butyral (PVB), polycarbonate (PC) or polyurethane (PU).

According to an advantageous characteristic, the irregularities are created on the surface of the substrate by forming a textured coating in which they are due to particles of a photocatalytic agent, such as titanium dioxide $TiO_2$. In the absence of any hydrophobic/oleophobic treatment, such a coating, as soon as it is exposed to suitable radiation, such as visible light and/or ultraviolet radiation, has two interesting properties: the presence of photocatalytic titanium oxide, as already seen, promotes the gradual disappearance, progressively as they build up, of stains of organic origin by causing them to degrade by a radical oxidation process.

Moreover, it also has a surface with a pronounced hydrophilic/oleophilic character, in particular when it includes an inorganic binder, which leads to a second non-negligible advantage: a hydrophilic character allows perfect wetting by water, which can settle on the coating. Instead of water being deposited as droplets, in the form of a visibility-impeding mist, there is a thin continuous film of water which forms on the surface of the coating and which is very transparent. This "anti-mist" effect is in particular exhibited when the measured value of a water contact angle is less than 5° after exposure to light.

In conjunction with a hydrophilic character, it may also have an oleophilic character allowing "wetting" by the organic stains which, as in the case of water, then tend to settle on the coating in the form of a continuous film which is less visible than the quite localized "spots". An "anti-organic-stain" effect is thus obtained which takes place in two stages: as soon as it is deposited on the coating, the stain is already barely visible. Next, it gradually disappears by photocatalytically initiated radical degradation.

The application of a substrate according to the invention to anti-stain anti-mist glazing is consequently also a subject of the invention.

Of course, the relief irregularities created on the surface of the substrate may be due to any, non-photocatalytic, particles such as metal oxides or, for example, $SiO_2$, as long as they are defined by at least two classes of different sizes, as defined above.

According to another advantageous characteristic, the substrate is made hydrophobic either by the incorporation of molecules imparting this property when the coating containing the irregularities is being formed, or by the cold deposition onto the substrate, optionally provided with such a coating, of a monomolecular film containing such molecules, this film having practically no effect on the underlying surface geometry.

Preferably, the hydrophobic agent satisfies the formula:

$$CF_3-(CF_2)_n-(CH_2)_m-SiX_3 \quad (I)$$

in which:
n=0 to 12, preferably 5 to 9,
m=2 to 5, preferably 2,
X=is a hydrolysable group such as a hydrogen or chlorine atom or an alkoxy, preferably methoxy, ethoxy or propoxy, group.

Although mixtures of compounds in which n is between 5 and 9 are suitable for carrying out the invention, it is preferable to use a pure compound for which, for example, n=7.

Consequently, the application of the substrate thus obtained to anti-rain glazing is also included within the scope of the invention.

Various techniques for creating irregularities of the required sizes on the surface of the substrate may be envisaged.

It is possible for the substrate to be mechanically abraded or chemically etched using, for example, an acid or a base.

The irregularities may also be introduced by applying to the substrate a coating incorporating them in the form of pre-created objects, in particular using a process in which colloids are deposited in a sol-gel matrix. The method of deposition used is of the dip-coating, cell-coating, spin-coating, laminar flow coating, roll-coating, liquid-spraying or flow-coating type.

In another embodiment, the irregularities of the required sizes are created while the coating on the substrate is being formed. This creation may result from an association, such as an agglomeration, of smaller objects introduced at the start and/or from an appropriate technique for forming the coating, such as CVD (Chemical Vapour Deposition) or pyrolysis.

The invention will be more clearly understood in the light of the following examples, which are inserted by way of illustration.

EXAMPLE 1

Colloids of titanium dioxide $TiO_2$ in a sol-gel matrix are deposited on a sublayer of silicon oxycarbide SiOC which was applied to a sheet of float glass.

The SiOC sublayer may be obtained by CVD using a mixture of $SiH_4$ and ethylene, diluted in nitrogen, as described in Patent Application EP-A-0,518,755. This sublayer is particularly effective for preventing the tendency of alkali-metal ions ($Na^+$, $K^+$) and alkaline-earth metal ions ($Ca^{++}$) coming from the float glass substrate to diffuse into the coating incorporating the $TiO_2$ colloids. These elements may in fact decrease the adhesion of the coating.

The colloids are deposited using a dispersion comprising
  a formulation based on silicon tetraethoxide $Si(OEt)_4$
    diluted in ethanol, in an amount of 0.1 mol per liter of ethanol, and
  a 20 wt. % dispersion of $TiO_2$ particles in ethylene glycol.

The formulation and the organic dispersion are in relative proportions such that the content of titanium dioxide particles in the dispersion is adjusted so as to obtain an 80 wt. % content of titanium dioxide in the coating once it has been deposited (mass of $TiO_2$ coming from the particles/mass of $TiO_2$ of the particles+mass of $SiO_2$ obtained by the decomposition of $Si(OEt)_4$, assuming that there is complete decomposition).

The $TiO_2$ colloids are lenticular in shape; they are approximately 45 nm in size and consist of amalgams of nanocrystallites 7 nm in size, these two sizes remaining completely discernible after the coating has been formed, in particular in a scanning electron micrograph.

In order to deposit the coating comprising eventually the $TiO_2$ colloids in an inorganic binder consisting of $SiO_2$, the dip-coating technique is used. The coating on the substrate is cured using a heat treatment which comprises heating at 100° C. for 4 hours and then at 550° C. for 4 hours.

A hydrophobic monomolecular film consisting of heptadecafluorodecyltrichlorosilane of formula: $CF_3-(CF_2)_7-$ $(CH_2)_2$—$Si(Cl)_3$ is then grafted onto the surface thus obtained, by dipping the latter in a 0.3 wt. % solution of this compound in decane. The grafting is then carried out in dry air. A grafted fluorosilane film, having a uniform thickness of a few angstroms is obtained which does not substantially modify the geometry of the underlying textured coating. The sizes of the irregularities, 7 nm and 45 nm, remain measurable, as they do also in the end-product.

The advancing and receding contact angles are measured by the growth and shrinkage, respectively, of a drop of water, these being induced by means of a pipette. In the first case, the contact angle increases as the drop grows, and then decreases at the moment when a detachment, i.e. a sudden shift in the triple point, is observed. The contact angle measured at this precise moment is the advancing contact angle. In the second case, the opposite situation occurs.

The advancing and receding contact angles obtained in this case are 170° and 120°, respectively.

These values should be compared with those obtained for a hydrophobic monomolecular film grafted under the conditions described above on standard float glass (with no surface irregularities): the advancing contact angle is about 110–120° and the receding contact angle is about 80–90°.

EXAMPLE 2

Example 1 was reproduced, replacing the lenticular $TiO_2$ colloids with $TiO_2$ nanocrystallites having a single size—a diameter of 5 nm.

In reality, implementation of the operating conditions described in Example 1 results in a multilayer association of the nanocrystallites, in which association, in addition to the initial size of 5 nm, it is possible to distinguish clusters having an approximate maximum size of 20 nm. These two sizes differ by a factor of 4; the corresponding irregularities, although similar to those in the product obtained from the invention, are, however, therefore excluded therefrom.

The advancing and receding contact angles observed are respectively 145 and 110°, which corresponds, compared to Example 1, to a decrease in both the advancing contact angle and the receding contact angle.

Comparison with Example 1 shows that the latter is, to an unexpected degree, more hydrophobic in the case of a ratio of the two sizes of 45/7=6.43, instead of 20/5=4 in the case of Example 2.

EXAMPLE 3

Example 1 was reproduced, replacing the lenticular $TiO_2$ colloids with spherical $SiO_2$ colloids 50 nm in diameter which, under the aforementioned operating conditions, form a monolayer so that only their initial size may be observed in the end-product, which is covered with the hydrophobic monomolecular film.

The advancing and receding contact angles are respectively 146 and 93°.

Compared with Example 1, the receding contact angle is particularly low, of the same order as that mentioned above for standard float glass coated with a grafted hydrophobic monomolecular film.

This example indicates the essential character of surface irregularities falling into at least two classes of different sizes.

Consequently, the invention best meets the preoccupation with obtaining, in the first place, a high advancing contact angle and, in the second place, a low hysteresis or a high receding contact angle. The invention therefore provides a substrate whose hydrophobicity is markedly higher than that known hitherto.

What is more, in the absence of any hydrophobic treatment of the substrate according to the invention, such a substrate having a textured coating based on titanium dioxide particles exhibits excellent anti-stain and anti-mist properties. In particular, mist does not form on this substrate, or is imperceptible. This is manifested by a high degree of hydrophilicity/oleophilicity. A substrate having, as required, one of these opposing properties may therefore be obtained by a simple adaptation.

What is claimed is:

1. A window glazing comprising:
   a glass or plastic substrate of a window glazing, at least part of a surface of which differs from that of an ideal uniform, perfectly plain or even slightly curved sheet, in that it has a bumps-and-hollows relief which is defined by submicron sizes which, almost in their entirety, fall into at least two different classes, the respective representative values of which vary by a factor of at least 5.

2. The window glazing according to claim 1, wherein said relief varies by a factor of at least 100.

3. The window glazing according to claim 1, wherein said submicron sizes are at most 150 nm.

4. The window glazing according to claim 1, wherein said bumps-and-hollows relief is formed, entirely or partly, by one or more groups of substantially identical objects defined by at least two sizes falling into said different classes varying by a factor of at least 5.

5. The window glazing according to claim 1, wherein said relief is formed by a group of rods having a single orientation or many orientations.

6. The window glazing according to claim 1, wherein said bumps of said bumps-and-hollows relief is formed, entirely or partly, by first objects which are grafted onto second objects.

7. The window glazing according to claim 1, wherein said bumps of said bumps-and-hollows relief is formed, entirely or partly, by first objects which are agglomerated so as to form second objects.

8. The window glazing according to claim 1, which is provided with a transparent coating.

9. The window glazing according to claim 1, wherein said relief is provided by a coating containing a photocatalytic agent.

10. The window glazing according to claim 9, wherein said photocatalytic agent is titanium oxide.

11. The window glazing according to claim 8, wherein said coating contains a hydrophobic agent.

12. The window glazing according to claim 8, wherein said coating is a mono-molecular film which does not substantially modify the surface geometry of the glass or plastic substrate.

13. The window glazing according to claim 11, wherein said hydrophobic agent is a fluoroalkylsilane of the formula:

$$CF_3-(CF_2)_n-(CH_2)_m-SiX_3 \qquad (I)$$

in which:
   n=0 to 12,
   m=2 to 5,
   X=a hydrolysable functional group.

14. The window glazing according to claim 1, wherein said relief is an anti-stain and anti-mist glazing.

15. The window glazing according to claim 1, wherein said relief is an anti-rain glazing.

16. A process for preparing the window glazing according to claim 1, comprising:

mechanically abrading or chemically etching the surface of said glass or plastic substrate with an acid or base.

17. A process for preparing the window glazing according to claim 1, comprising:

coating the surface of said plastic or glass substrate with pre-created objects having sizes falling into said at least two different classes varying by a factor of at least 5.

18. The process according to claim 17, comprising depositing colloids in a sol-gel matrix onto said surface of said glass or plastic substrate.

19. A process for preparing the window glazing according to claim 1, comprising:

coating the surface of said glass or plastic substrate with particulate material which creates particles of submicron sizes falling into said at least two different classes varying by a factor of at least 5 as the particulate material is coated on said substrate.

20. The process of claim 19, wherein some of said submicron particles agglomerate or associate thereby giving rise to said submicron sizes falling into said at least two different classes varying by a factor of at least 5.

21. The process according to claim 20, wherein said coating is by a CVD or pyrolysis technique.

* * * * *